United States Patent
Anglum

(10) Patent No.: US 7,251,625 B2
(45) Date of Patent: Jul. 31, 2007

(54) CUSTOMER IDENTIFICATION SYSTEM AND METHOD

(75) Inventor: Timothy J. Anglum, Chanhassen, MN (US)

(73) Assignee: Best Buy Enterprise Services, Inc., Richfield, MN (US)

( * ) Notice: Subject to any disclaimer, the term of this patent is extended or adjusted under 35 U.S.C. 154(b) by 0 days.

(21) Appl. No.: 09/970,236

(22) Filed: Oct. 2, 2001

(65) Prior Publication Data

US 2003/0065595 A1   Apr. 3, 2003

(51) Int. Cl.
*G06Q 40/00* (2006.01)
(52) U.S. Cl. ...................................................... 705/35
(58) Field of Classification Search ............ 705/35–37, 705/10, 14
See application file for complete search history.

(56) References Cited

U.S. PATENT DOCUMENTS

| | | | |
|---|---|---|---|
| 5,687,322 A | | 11/1997 | Deaton et al. |
| 5,835,087 A | * | 11/1998 | Herz et al. ................... 715/810 |
| 6,070,147 A | | 5/2000 | Harms et al. |
| 6,078,891 A | * | 6/2000 | Riordan et al. ............... 705/10 |
| 6,078,892 A | * | 6/2000 | Anderson et al. ............. 705/10 |
| 6,088,722 A | * | 7/2000 | Herz et al. ................... 709/217 |
| 6,119,933 A | * | 9/2000 | Wong et al. ................. 235/380 |
| 6,233,564 B1 | * | 5/2001 | Schulze ........................ 705/14 |
| 6,327,574 B1 | * | 12/2001 | Kramer et al. ................ 705/14 |
| 6,424,949 B1 | * | 7/2002 | Deaton ......................... 705/14 |
| 6,662,166 B2 | * | 12/2003 | Pare ............................. 705/39 |
| 2002/0053076 A1 | * | 5/2002 | Landesmann ................ 725/10 |
| 2002/0116348 A1 | * | 8/2002 | Phillips et al. .............. 705/400 |
| 2004/0153368 A1 | * | 8/2004 | Freishtat et al. .............. 705/26 |

FOREIGN PATENT DOCUMENTS

| | | | |
|---|---|---|---|
| JP | 2000076351 A | * | 3/2000 |
| WO | WO 2004/088457 A2 | * | 10/2004 |

* cited by examiner

*Primary Examiner*—Narayanswamy Subramanian
(74) *Attorney, Agent, or Firm*—Beck & Tysver, PLLC

(57) ABSTRACT

A method and system are presented for identifying a customer in a commercial transaction using less than complete identifying information. A name for the customer is extracted from a credit card during a purchase transaction. A trade area for the point of sale location used to restrict a search of a demographic database to find a list of potential identity matches having names similar to the name on the credit card. A best match generator creates a profile of the expected purchaser of the products in the transaction. Using demographic information about each identity in the list of potential identity matches, each identity is compared to the profile and given a score. The highest scoring identity is then considered the best match. The best match identity is then assumed to be the identity involved in the transaction, and the customer database is updated to reflect this determination.

8 Claims, 8 Drawing Sheets

Figure 3

| POS ID | Zip | Count of Transactions | % of Total Transactions | Cumulative Percentage | Distance to POS |
|---|---|---|---|---|---|
| 3 | 55418 | 1024 | 17.94% | 17.94% | 2.0 |
| 3 | 55426 | 786 | 13.77% | 31.72% | 3.2 |
| 3 | 55476 | 642 | 11.25% | 42.96% | 1.8 |
| 3 | 55421 | 464 | 8.13% | 51.10% | 2.8 |
| 3 | 55417 | 323 | 5.66% | 56.75% | 3.2 |
| 3 | 55432 | 318 | 5.57% | 62.33% | 5.8 |
| 3 | 55442 | 295 | 5.17% | 67.50% | 3.0 |
| 3 | 55211 | 283 | 5.05% | 72.54% | 6.9 |
| 3 | 55419 | 225 | 3.94% | 76.49% | 4.2 |
| 3 | 55416 | 210 | 3.68% | 80.16% | 4.9 |
| 3 | 55402 | 208 | 3.64% | 83.81% | 15.3 |
| 3 | 55411 | 188 | 3.29% | 87.10% | 6.1 |
| 3 | 55422 | 156 | 2.73% | 89.84% | 4.3 |
| 3 | 55424 | 112 | 1.96% | 91.80% | 7.8 |
| 3 | 55119 | 64 | 1.12% | 92.92% | 8.8 |
| 3 | 55410 | 55 | 0.96% | 93.88% | 8.5 |
| 3 | 55412 | 48 | 0.84% | 94.73% | 4.1 |
| 3 | 11042 | 1 | 0.02% | 100.00% | 1007.8 |

Figure 6

| Profile for Particular Luxury Item ||||
|---|---|---|---|
| | Attribute | Value | Score |
| Test I | Age | Under 21 | 1 |
| | | 21-30 | 3 |
| | | 31-45 | 6 |
| | | 46-60 | 8 |
| | | Over 60 | 5 |
| Test II | Income | Under $25,000 | 1 |
| | | $25,000-$40,000 | 2 |
| | | $40,000-60,000 | 4 |
| | | $60,000-$90,000 | 6 |
| | | $90,000-$150,000 | 7 |
| | | $150,000-$225,000 | 8 |
| | | Over $225,000 | 7 |
| Test III | Marital Status | Single | 0 |
| | | Married | 1 |
| Test IV | Education | High School | 1 |
| | | Some College | 2 |
| | | College | 5 |
| | | Graduate | 5 |
| Test V | Age of Children In Home | None | 5 |
| | | Under 3 | 1 |
| | | 3-7 | 2 |
| | | 8-13 | 3 |
| | | 14-18 | 5 |

| | Additional Tests | Score |
|---|---|---|
| Test VI | Identity not found in Customer Database | 0 |
| | Identity found, but no prior purchases in this category of goods | 2 |
| | Identity found, one or two prior purchases in this category of goods | 3 |
| | Identity found, three or more prior purchases in this category of goods | 5 |
| Test VII | Perfect name match | 3 |
| | Less than perfect name match | 0 |

160

CUSTOMER IDENTIFICATION SYSTEM AND METHOD

TECHNICAL FIELD

The present invention relates generally to customer tracking in a retail environment. More particularly, the present invention relates to the utilization of a customer name and a trade area for a retail store to identify a customer in a transaction and update a customer database.

BACKGROUND OF THE INVENTION

Almost every retailer has recognized the need to track the purchases made by customers in order to understand the desires and trends of its customers. Generally, such information is stored in one or more computerized databases. These databases are able to track purchases made throughout a retail chain, and can be broken down according to a variety of parameters, such as by product, region, store, or department. Once the database of purchases has been created, it can be used for forecasting, inventory management, and for promotional planning.

Many retailers have understood that these types of databases can be even more useful if they are able to track the habits of individual customers. If this can be done accurately, it would be possible to improve forecasting and to perform complex demographic research on their customers. In addition, customer specific purchase information would allow the retailer to greatly improve the efficiency of its marketing and promotional planning, and would even allow direct one-on-one marketing according to a customer's individual tastes, as determined by the customer's previous purchases and general buying habits.

Unfortunately, it can be difficult to properly associate a particular purchase at a retailer with a particular customer. Some means must be employed to identify the customer at the point of sale. For instance, a store representative may ask the customer for their phone number. This information is then entered into a device at the point of sale, and then compared with the existing database of customers. The comparison determines whether the customer already exists in the database. If an entry for that customer does exist in the database, the purchase then being made is added to the database entry for an existing customer. Otherwise, a new customer entry is added to the database.

Various methods can be used to identify customers at the point of sale, with each method creating a different degree of confidence that the customer has been successfully identified. The most accurate method may be to request identifying information such as a phone number directly from the customer. This information can then be compared with the database. If similar or identical information is retrieved, the customer will be requested to verify that the information in the database is accurate. If the match in the database is for a different individual, a new record in the database is created for that individual. Sometimes, multiple entries in the database might match the information received from the customer. In these circumstances, the customer can be directly asked to select the appropriate entry, and, if necessary, multiple entries in the database for the same individual can be merged together.

Unfortunately, requesting such detailed, identifying information from the customer at the point of sale has several negative effects. First, the customer is often annoyed at the perceived invasion into their privacy. Second, requesting such information slows down the sale transaction, which decreases the efficiency for the store and increases customer frustration with any delay. Finally, customers may choose to provide inaccurate information to indicate their displeasure at the system, which has obvious implications to the usefulness of the database.

As a result, several companies have provided a service to retailers that identify a customer according to the credit card number used by the customer at the point of sale. The system simply looks the number up in a reverse listing of identities and credit card numbers provided by credit card issuers. Using this system, all credit card purchases can be associated with a particular individual, without any of the adverse consequences described above. In addition, because each credit card number is uniquely assigned to one individual or household, the returned identifying information has a high degree of accuracy.

Unfortunately, recent statutory changes in the United States has made the provision of identifying information from credit card numbers difficult. As a result, retailers are now searching for a way to automatically identify customers at the point of sale without requiring the customer to directly identify themselves.

SUMMARY OF THE INVENTION

The present invention meets this need by providing a system and method that identifies customers utilizing a credit card at the point of sale without using the credit card number for identification purposes. Rather, the current system utilizes the name embedded on the credit card as an initial identifier.

During a credit card transaction at a point of sale, the name and credit card number are usually read off of the magnetic strip found on the back of the credit card. In the present invention, the name is searched against a comprehensive demographic database in order to develop a list of potential matches. The list of potential matches is created by identifying entries in the database that have a similar name as that found on the credit card, and also have a residential address within the trade area for the retail store. The trade area is determined by a statistical analysis of customer purchase patterns on a store-by-store basis.

Once the list of potential matches is created, the list is compared to the products purchased with this credit card. The present invention then applies business rules to determine the most likely match between the actual customer making the purchase and an entry on the list of potential matches. These business rules can be embodied in a variety of tests applied to each of these potential matches. One test might examine the strength of the name match, while another will identify whether a potential match is an existing customer that has purchased similar merchandise in the past. Some of the more sophisticated tests develop a demographic profile based on the items purchased with the credit card, and then compare the characteristics of the potential matches against this profile. There is no guarantee that the system will select the correct match. It is clear, however, that the odds of determining the correct match are improved by greater sophistication in the business rules used to examine the list of potential matches.

BRIEF DESCRIPTION OF THE DRAWINGS

FIG. 3 is a table showing data used to determine the trade area for a point of sale location according to one embodiment of the invention.

FIG. 6 is a table showing a profile for a particular luxury item comprised of a variety of tests.

DETAILED DESCRIPTION OF THE INVENTION

The present invention is able to specifically identify customers in credit card or debit card transactions without using the card number as the identifier. This invention works equally well with credit cards, debit cards, or any other payment mechanism that utilizes a unique identifier to identify a payment account and associates that unique identifier with a non-unique identifier, such as name.

For ease in understanding this application, the ability to identify a customer will be described in the context of a credit card transaction. The scope of the present invention is not so limited, however, as it can be utilized in any situation where the name of the customer can be identified. In fact, the only unique aspect of the name is that it is a partial identifier, in that a name alone will not uniquely identify a customer, but rather provides only a strong hint as to the identity of the customer.

Figure 1:
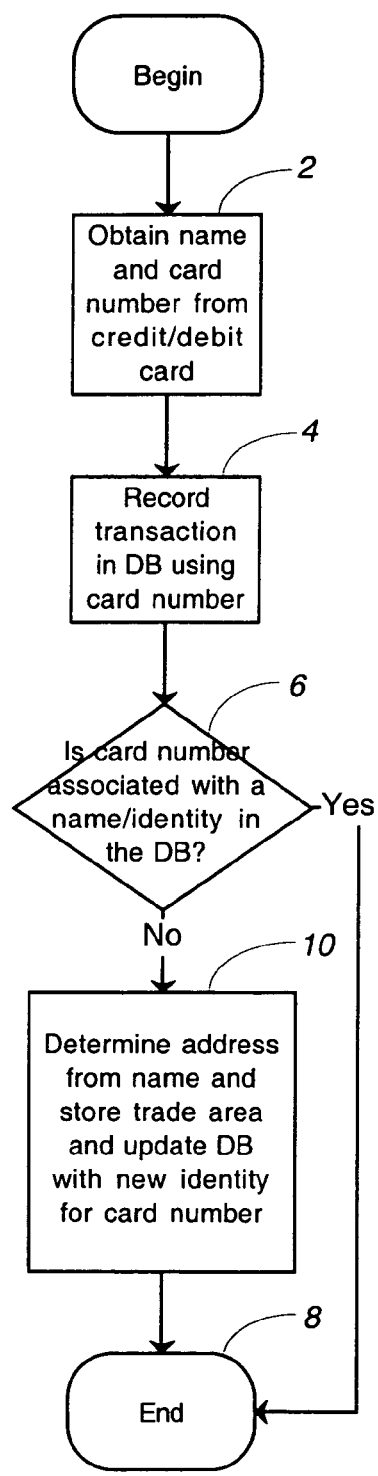
FIG. 1 is a flow chart showing the context in which the invention is utilized.

The broad context in which the present invention is used is shown in the flowchart of FIG. 1. During a credit card purchase, the card will be swiped through a card reader that reads the magnetic strip found on the back of the card. The strip generally encodes the credit card number and the name of the credit card holder. The reading of this information is shown as step 2 in FIG. 1.

Once this information is obtained, it is possible to update a customer database with the details of the purchase transaction, as shown in step 4. Traditionally, the items purchased, the store where purchased, and the day and time of the purchase are stored in the customer database along with the credit card number. Since the purchases are stored with the credit card, all purchases made with the same credit card can be linked with each other for later analysis.

While this is a useful way to analyze purchase data, it would be preferred to associate purchases with a specific person or identity, rather than a specific credit card. Thus, the preferred customer database will also contain identity records, through which individuals are associated with particular credit card numbers. In this way, purchases can be associated with individuals as well as credit card numbers.

Step 6 in FIG. 1 determines whether any identity record is associated with the credit card number used in the current transaction. This is accomplished by examining the purchase database itself, and does not require the use of an external, reverse look-up table provided by credit card companies. If an identity is already related to the card number, then there is no need to do any additional research to determine the individual using this credit card. The information stored in step 4 is simply linked to the identified individual associated with this card number. As a result, the process will terminate at step 8.

If the customer database has no record of any individual being associated with the card number being used, then it is necessary to identify the user of the credit card and update the customer database accordingly. This is accomplished by the present invention 10, which is set forth in the box diagram in FIG. 2.

As shown in this Figure, the present invention 10 utilizes information obtained from the point of sale (or "POS") location 20 in order to identify the user of the credit card. Particularly, the present invention utilizes the purchase data 22, the name 24 found on the card, and an identifier 26 for the POS location 20 for the purpose of identifying the individual purchasing the items at POS 20. The number of the credit card, while used at the POS location 20 to complete the purchase transaction, is not used by the present invention 10 to identify the customer.

A point of sale location 20 will generally be a physical store location, although it is possible to use virtual stores as POS locations 20. Each point of sale location 20 combines the purchase data 22, name 24, and POS ID 26 into POS information 28, and then transmits this information 28 to a centrally located potential match list generator 30.

Figure 2:
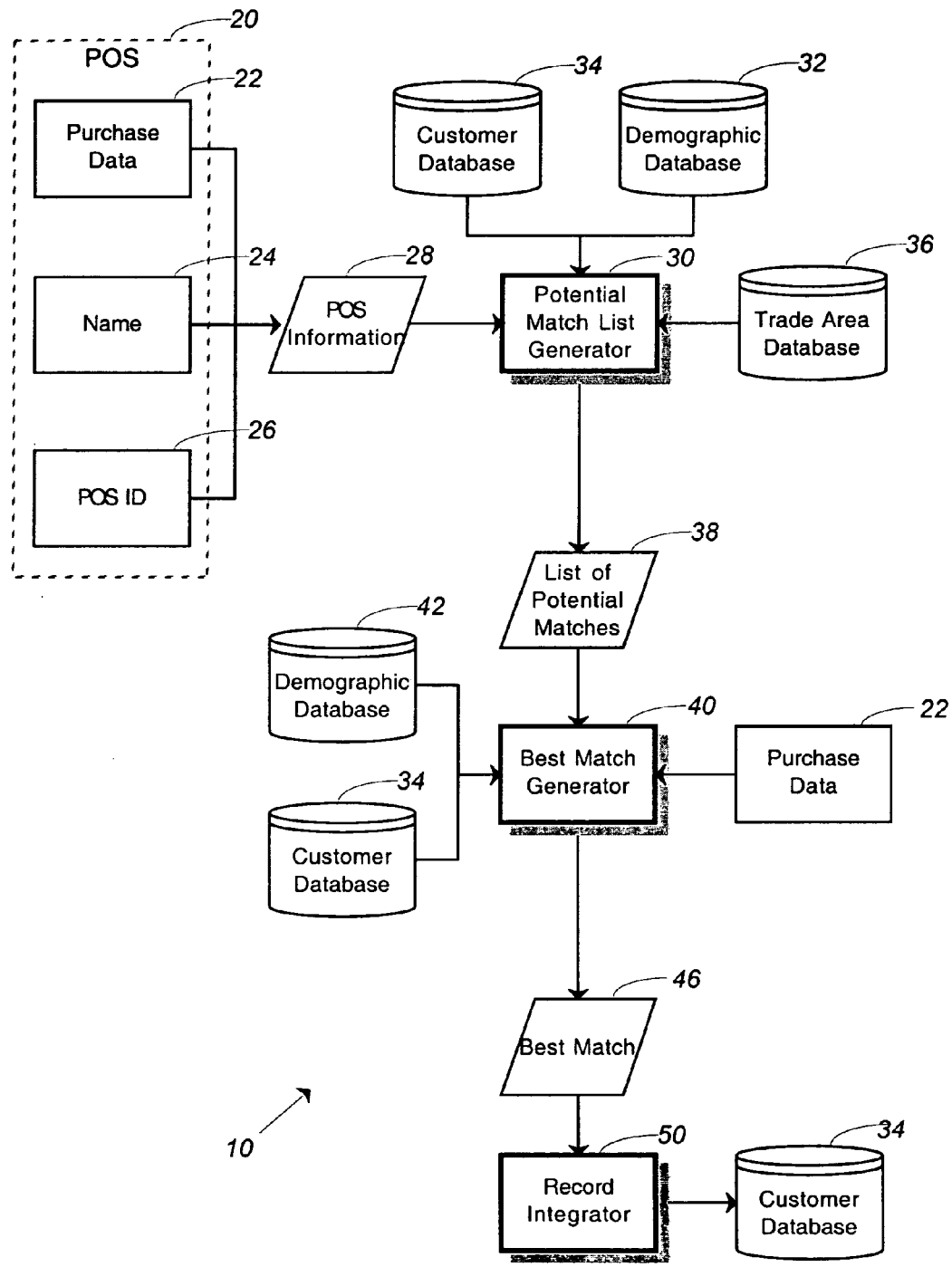
FIG. 2 is a box diagram showing the basic components of the present invention.

The potential match list generator 30 is an application running on a general purpose computer. The match list generator 30 takes the POS information 28 from a variety of point of sale locations 20, and analyzes the information 28 utilizing three databases 32, 34, and 36. The first database 32 is a broad, demographic database that contains contact information and other demographic information for the relevant geographic area. In the preferred embodiment, the demographic database 32 is a nationwide database containing household and individual information from across the country. Depending on the context in which the present invention is utilized, the demographic database 32 could contain information from a smaller or larger geographic area. In addition, while the demographic database 32 is shown in FIG. 2 as a single database, it would be a simple alteration to utilize multiple demographic databases in the present invention instead of a single database.

The second database 34 is a customer database containing purchase data for the point of sale location 20 as well as other stores that are managed by the system 10. This customer database 34 is the same database that the entire system 10 is designed to maintain and update.

The third database 36 is a trade area database that contains information about past sales transactions at each of the point of sale locations 20 that will be analyzed by the match list generator 30. The trade area database 36 is utilized to identify the trade area, or "shopping area," for each point of sale location 20, as identified by the POS ID 26. This area is defined as the primary geographic region from which the store pulls shoppers. In defining this region, it is possible to use postal zip codes, telephone area codes or exchanges, municipality boundaries, or any other geographically predetermined boundaries. The trade area is determined by statistically examining the past purchase history at the store. Ideally, trade areas will be determined using only recent data, which will lead to more current results and allow the trade area for each store to fluctuate according to the actual buying patterns of customers at the store.

FIG. 3 shows a table 60 that can be used to help determine a trade area for a POS location 20. The table 60 has six columns. The first column 62 identifies the POS ID 26 while the second column 64 identifies the zip codes in which customers of this POS location 20 reside. The third column 66 identifies the number of recent sales made at the identified POS location 20 to customers that reside in the identified zip code. This data is obtained from the purchase history for each POS location 20, which could include data generated by the present invention 10 as well as data generated by other means.

These first three columns 62, 64, 66 allow the table 60 to be used to analyze the geographic spread of the customers that shop at the store identified by the POS ID 26 of column 62. This analysis takes place in the next three columns 68, 70, and 72. Column 68 identifies the percentage of total transactions at the identified store that took place to customers within the zip code. When the rows are sorted according to column 66 or 68, column 70 can then present a useful, cumulative percentage of sales. It is then possible to set a cut-off threshold that determines the trade area for the store. In FIG. 3, the cut-off threshold is set at ninety percent, and is represented by a double line 74. Those zip codes above the line 74 make up ninety percent of the recent sales to the store, and form the store's trade area. Those zip codes below the line 74 are outside of the store's trade area. By examining column 72, it is clear that the zip codes are not chosen merely by geographic proximity to the store, since some zip codes outside of the trade area are closer to the store than zip codes within the trade area.

The use of trade areas is preferred over a strict geographic proximity test (such as all households within 20 miles of the store location) since a trade area is a much more accurate predictor of the households that actually shop within a store. A strict geographic area will not allow for distinguishing between a rural store that pulls from a larger area than an urban store. In addition, even if the strict geographic area is sensitive to the population density (i.e., 5 miles for an urban store, 30 miles for a rural store), the trade area technique allows for complex geographic areas to be created for each store according to actual shopping patterns in the area. In addition, trade areas defined by shopping patterns can be constantly redefined simply by re-analyzing recent purchase data at regular intervals, and thus reflect changing purchase habits.

Of course, the table 60 shown in FIG. 3 is just one method that could be used to generate a trade area for a particular point of sale location 20. Other techniques to generate the trade area could be utilized and still be within the scope of the present invention, so long as the trade area is determined by using actual sales history from the store rather than mere geographic proximity.

Returning to FIG. 2, the potential match list generator 30 uses the store ID 26 and the trade area database 36 to determine a trade area for that store. Alternatively, the trade areas for all POS locations 20 could be predetermined, with only the resulting trade area being stored in the trade area database 36. Either way, the match list generator then searches the demographic database 32 and the customer database 34 for individuals residing in the trade area having a name that is similar to the name 24 taken from the credit card. These databases 32, 34 can use advanced fuzzy logic and synonym search techniques in order to increase the quality of the matches. Such techniques are well known in the prior art, and allow a search of nicknames, abbreviations, and other known variations that previously prevented high quality name matching.

The match list generator 30 then takes this information and creates a list of potential matches 38. Because multiple databases 32, 34 can be used as the source of the potential match list 38, the match list generator 30 must be sure to pare out any duplicate listings in the list 38. After this is accomplished, the list 38 will contain zero, one, or many potential matches for the name found on the credit card at the POS location 20. Since it is possible for more than one name to be found on list 38, this list 38 is presented to a best match generator 40 in order to determine a best match 46. Like the potential match list generator 30, the best match generator 40 is an application program running on a general-purpose computer. The best match generator 40 can be run on the same computer running the potential match list generator 30. In fact, both generators 30, 40 could even form separate subprocesses of the same application program.

The best match generator 40 utilizes two databases 42 and 34, as well as the purchase data 22 provided from the point of sale 20 to analyze the list of potential matches 38 and generate the best match 46. The first database 42 is a demographic database, which may be the same demographic database 32 used in connection with generating the list of potential matches. The important aspect of the demographic data shown as element 42 is that it can be used to determine demographic information for the identities found on the list of potential matches 38, such as family income, and the age and gender of all individuals living in a household.

The second database 34 is the main customer database that was also used to help create the list of potential matches 38. The customer database 34 is used by the best match generator 40 to analyze past purchase behavior of each of the identities found in the list of potential matches 38.

The best match generator 40 uses these databases 42 and 34 to determine which identity in the list of potential matches was the most likely purchaser of the products identified in the purchase data 22. Generally, this is accomplished by creating a profile of the likely purchaser of the products, and comparing that profile against what is known about each of the identities on this list 38. For example, if the purchase data 22 indicates that the item purchased was an expensive, luxury item, the profile created for that product would indicate that the likely purchaser probably has a large income. The demographic database 42 would then be utilized to examine the comparative incomes of the identities on the list 38 to help determine the best match 46.

In addition, the present invention might look at the confidence quality of each name in the list of potential matches 38. For instance, the name on the credit card might be "Richard M. Nixon." Two individuals with similar names might reside within the trade zone of the store in which the purchase is made, specifically an individual known only as "Dick Nixon" and another individual who goes by the full name "Richard M. Nixon." In this circumstance, the confidence of the second name on the list would be higher than the first. As a result, the second name would score higher on the match quality test.

In the preferred embodiment, different tests are applied and separately scored, and a total score is created for each identity on the list 38. The identity with the highest score is then chosen as the best match 46. The details of this type of scoring are set forth below in connection with FIGS. 5, 6, and 7.

The best match 46 is then used by a third software module known as a record integrator 50 to update the customer database 34 with the contact information. Much like the best match generator 40 and the match list generator 30, the record integrator 50 operates on a general purpose computer, and can form a separate program or form part of a single application having the features of the other programs 30, 40. The details of the process used by the record integrator 50 is shown below in connection with the flow chart of FIG. 8.

Figure 4:
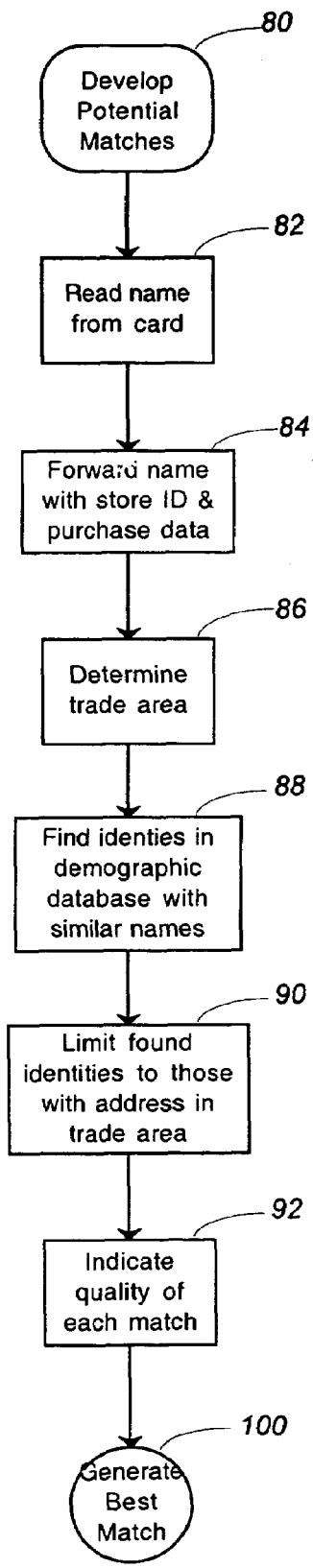
FIG. 4 is a flow chart showing the detailed process of developing a list of potential matches.

FIG. 4 contains a flow chart 80 showing the process used by the current invention to generate a list of best matches. The first step 82 is to extract the name 24 from the magnetic stripe on a credit card. This is a relatively straightforward process, and is commonly accomplished by credit card readers. The purpose of this step is to obtain the name 24 of the purchaser so that it can be associated with the purchase transaction, as explained above. Of course, the present invention is not limited to this method of obtaining a name. For instance, it would also be possible to obtain the name off the card through another interface, such as a scannable optical code, or by hand entering the name off the face of the credit card. In addition, this process can work in transactions other than credit cards, such as in debit card transactions. It would even be possible to take a name from a check, however it is unlikely that the present invention would be necessary for checking transactions. This is because it is now standard procedure to obtain a driver's license number for every check over a threshold amount received at a store. This driver's license number can then be used to accurately obtain a specific identity for the purchaser.

Once the name 24 is obtained, it is combined with the POS ID 26 and purchase data 22 and forwarded to the potential match list generator 30, in step 84. The generator 30 then utilizes the trade area database 36 to obtain an appropriate trade area in step 86. As explained above, the trade area in the preferred embodiment is determined by examining recent purchase data for the POS ID 26 and determining the geographic area from which customers for that store generally originate.

In an alternative embodiment, the trade area is determined not only by examining the POS ID 26, but also by examining all other transactions in the customer database 34 that have been associated with the credit card number. As explained above in connection with FIG. 1, all credit card transactions are stored in the customer database 34 and associated with a credit card number, even if there is no known association between that number and an actual individual. As a result, it is possible that there are numerous transactions associated with a credit card number before any association with an actual identity is made. By examining all of these transactions, it is possible to expand the trade area to cover all stores for which this credit card has been used to make purchases. Alternatively, the trade area could cover only those stores for which a set number of transactions have taken place.

It would even be possible to use the prior transactions for a credit card number to narrow a trade area. One way of doing this is by examining the trade areas for all of the stores for which at least two (or some other number) purchases have been made using the credit card number. The trade area used to make the list of potential matches 38 could be narrowed to include only those areas in which the trade areas of the separate stores overlap.

Regardless of how the trade area is defined in step 86, the process 80 will search the demographic database for identities having names that are similar to the name 24 in the POS information 28 (step 88), and which also are associated with an address found within the trade area (step 90). Although these two steps 88, 90 are shown as separate steps in FIG. 4, they will most likely form part of a single database query and hence be accomplished together. If they are kept separate, these steps 88, 90 can be accomplished as set forth in FIG. 4, or in the opposite order. Since it is possible that each of the identities in the demographic database 32 will have multiple addresses, such as home, work, or vacation, step 90 may require that the identity be associated with only one address in the trade area.

Preferably, step 92 then examines the list of identities found through steps 88 and 90, and assigns a quality to the match. In this way, it will be possible to distinguish between an exact name match and a match made through fuzzy logic and synonym searching capabilities. Once this is accomplished, the list of potential matches 38 is complete, and processing is passed to process 100 which determines the best match.

Figure 5:
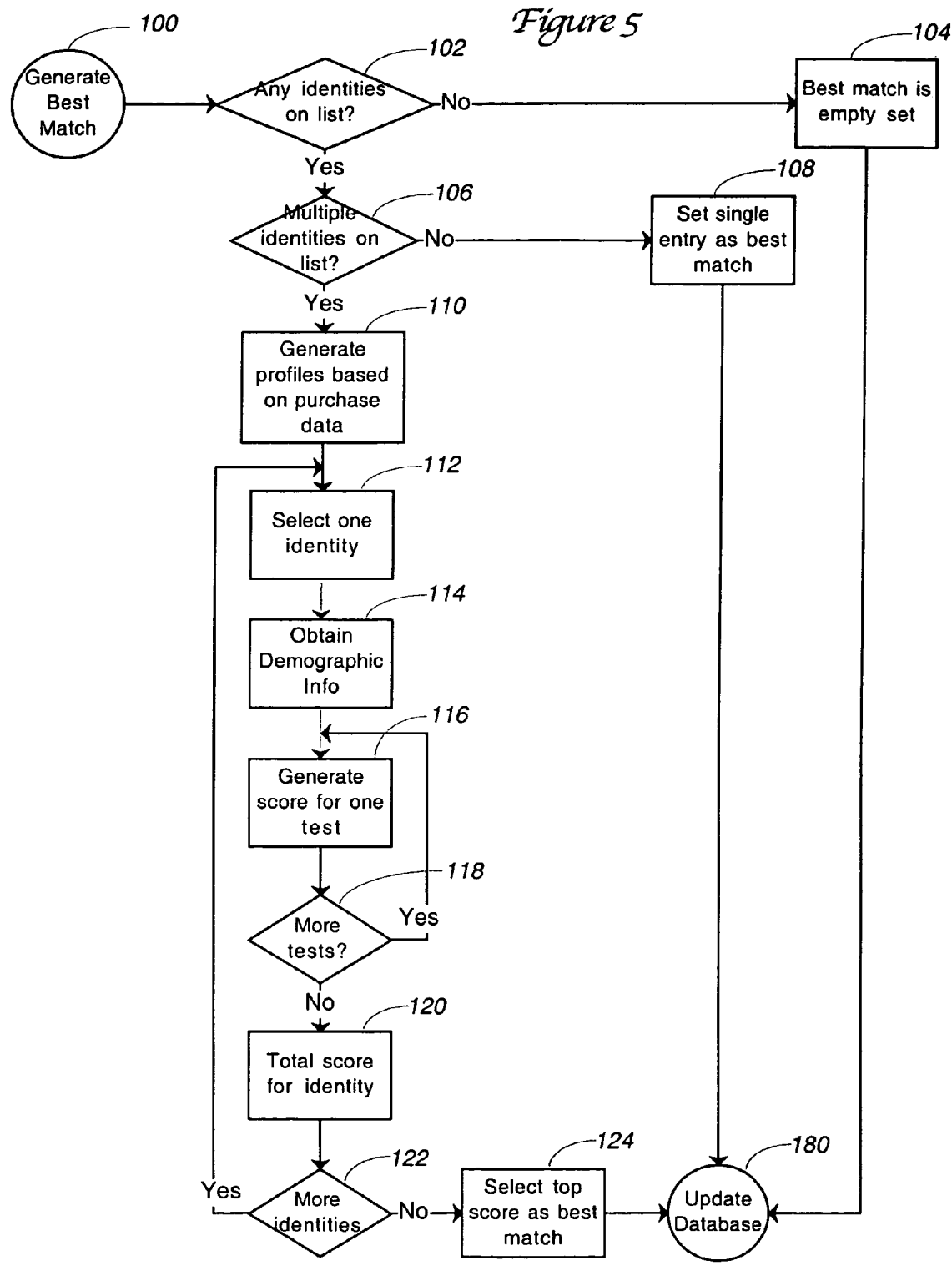
FIG. 5 is a flow chart showing the detailed process of identifying a best match from the list of potential matches created in FIG. 4.

The best match process 100 is shown in FIG. 5. This process 100 starts with a test at step 102 to determine whether or not the list of potential matches 38 contains any identities at all. If not, the best match 46 is simply left empty in step 104, and processing will continue with the update database process 180. If there are identities on list 38, step 106 will determine if multiple identities exist. If not, the best match 46 is set to the single identity in list 38 (step 108), and process 180 is started.

If there are multiple entries on list 38, then it is necessary to analyze the list 38 to determine the best match 46. The first step 110 in doing so is to generate a purchaser profile for the purchased products. The purchaser profile is generated using historical purchase data as well as marketing data for the products. For instance, the purchase data may indicate that the sole product purchased was a high-end luxury item, such as a plasma, flat-panel television or a $3,000 silk suit. Market research and historical purchase data may indicate that the most likely purchaser for such a luxury item is a married individual with older or no children, aged 46-60, with at least a college level education and who makes between $150,000 and $225,000 per year. This example profile contains five characteristics: marital status, children in household, age, education level, and income. A profile could have more or fewer characteristics, as is appropriate given the quality of the market research and data analysis that gives rise to the profile.

Rather than merely generating one preferred value for each characteristic in a profile, the preferred embodiment turns the profile into a grouping of tests that reflects the importance of each characteristic, and allows the profile to consider multiple values as relevant within a given characteristic. FIG. 6 shows such a profile 150 for the luxury item discussed in the previous paragraph.

As seen in FIG. 6, profile 150 has five subtests 152, one for each of the characteristics in the profile. Each subtest 152 contains at least two possible values 154 for the associated characteristic, and provides a score 156 for each of the possible values 154.

A profile 150 like the one in FIG. 6 is generated for the product or products being purchased as identified in the purchase data 22. Generally, there will not be enough quality data to generate a profile for each separate item being sold at the POS location 20, so profiles will be generated according to product type. Example product types might include kitchen appliances, luxury/designer clothing items, children's videos, hunting equipment, health and beauty items, or computers. Obviously, these categories can range from extremely broad (i.e., clothing or food) to so narrow as to be product specific. The most important factor in determining the breadth of the category is the accuracy with which the profile 150 can be created.

It is possible to utilize the present invention by profiling only a single item being purchased during a transaction, even if multiple items are actually found in the purchase data 22. It would be important to select the item to be profiled carefully so as to most accurately select the best match 46 from the list of potential matches 38. One way of doing this is to select the most expensive item or category found in the purchase data, or to select the item or category that was purchased in the greatest quantity. In the preferred embodiment, multiple items are used to generate the profile. This can be accomplished by using statistics to analyze the items as a group in order to create a single test for each characteristic. With numerous items, this type of statistical analysis could be difficult. Alternatively, each item can be separately profiled, and the multiple profiles can be combined with each score for each attribute value being summed together. Either way, a profile is created that matches most or all of the items purchased as shown in the purchase data.

In the preferred embodiment, the profile created in step 110 is created specifically for the products found in the purchase data 22 for the current transaction. In an alternate embodiment, however, it would be possible to examine all sales transactions in the customer database 34 for the current credit card, which would allow the creation of a profile 150 that represents all items ever purchased by the credit card.

In addition to the profile 150, it is also possible to create tests that are not based upon the demographic information available in demographic database 42. Two such tests are shown in the additional test set 160 of FIG. 7. The first test VI in test set 160 utilizes data found in the customer database 34. In this test, a higher score is generated when the selected identity is found in the customer database 34. This reflects a belief that a previous customer is more likely to be a match than a new, previously unknown customer is. The test VI also generates additional points if the customer database 34 shows that the customer has previously made purchases of the same category of goods as those found in purchase data 22. Like the categories that can be used to create the profile 150 described above, the categories used to evaluate test VI can be defined broadly or narrowly, depending upon the ability to create statistical relevant distinctions between classes.

Additional test set 160 also shows test VII, which is used to evaluate the strength of the name match made by potential match list generator 30. If the match were perfect, a higher score is generated than if the match were less than perfect.

Returning to FIG. 5, the profile 150 is generated in step 110. In step 112, a single identity from the list of potential matches 38 is selected. After the identity is selected, it is necessary to obtain demographic information about that identity, such as age and income. This is done in step 114, and can be accomplished by consulting the demographic database 42. Alternatively, since the same or similar database 32 could be used generate the list of potential matches 38, it is possible for the potential match list generator 30 to include these attribute values within the list of potential matches 38. In step 116, the demographic information for the selected identity is then compared to one of the tests in profile 150 and test set 160 in order to generate a test score.

As an example, the demographic database 42 may indicate in step 114 that the first identity is a 35 year old single woman, with no children, who has a college degree and an income of $65,000. This woman does not show up in the customer database 34, and the name match is less than perfect. The first test in profile 150 is run in step 116, which generates a score of 6 given her age of 35 years old. After this test is run in step 116, step 118 determines if there are any more tests in the profile. If so, processing returns to step 116 until test scores have been generated for all of the tests. At that point, step 120 generates a total score for the identity. The example 35 year old woman would have a total score of 22 (6 for age 35, 6 for an income of $65,000, 0 for being single, 5 for being a college graduate, 5 for having no children at home, 0 for not appearing in the customer database, and 0 for a less than perfect name match).

Once the total score for an identity is created in step 120, the best match process 100 determines whether any more identities need to be evaluated in step 122. If more identities remain, the process returns to step 112 and the next identity is selected and scored. When step 122 determines that all of the identities have been scored, step 124 selects the best match 46 by selecting the top scoring identity in the list of potential matches 38.

In one embodiment of the present invention, step 124 requires the highest scoring identity to have a minimum score before selecting that identity as the best match 46. If the highest scoring identity does not meet this minimum score, the best match 46 will be left empty. In this embodiment, it would also be necessary to develop a test score even where only a single identity was found in the list of potential matches 38. Thus, step 108 in FIG. 5 would have to include the development of a test score and the comparison of this score against the allowed minimum score.

Figure 8:
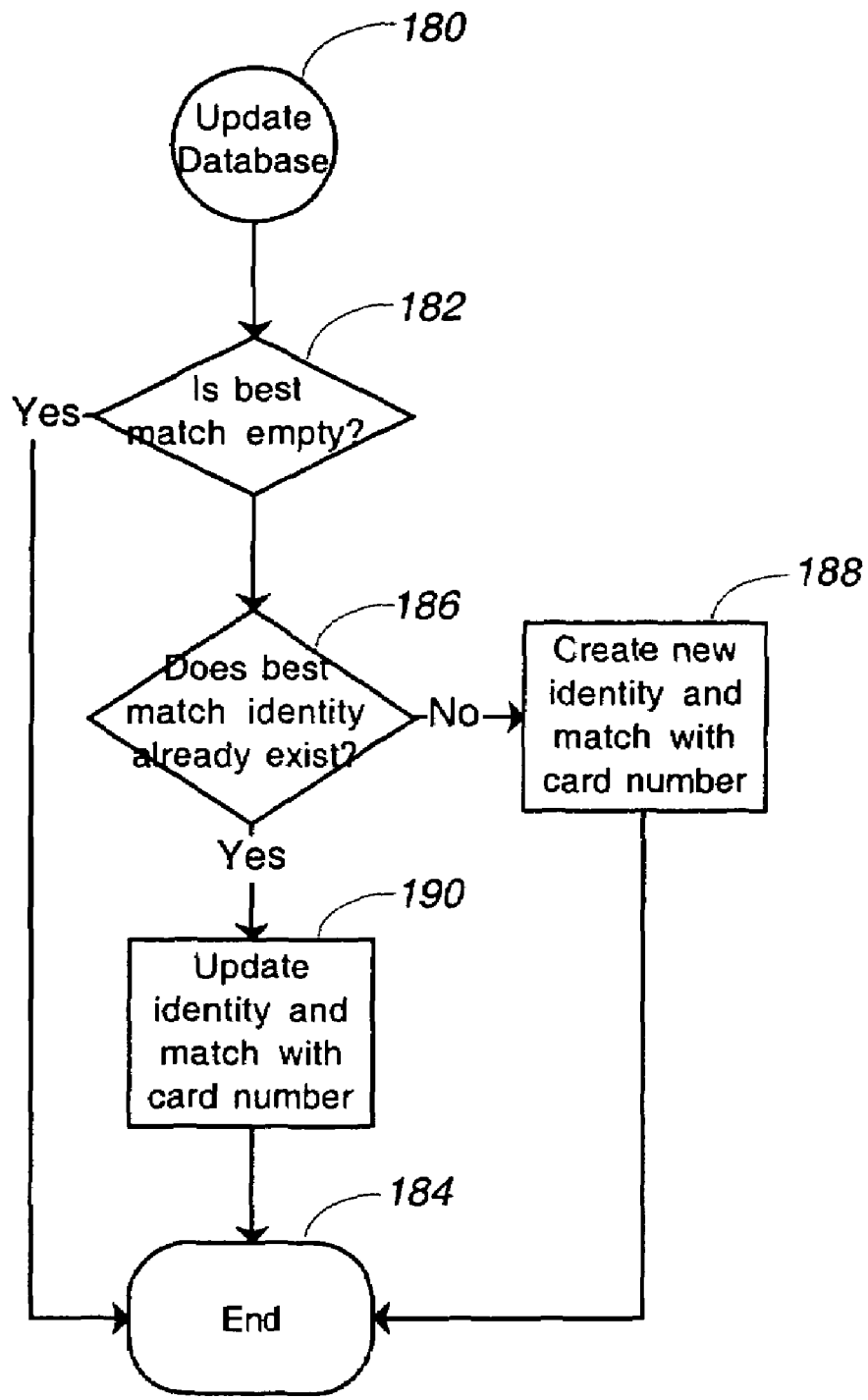
FIG. 8 is a flow chart showing the integration of the best match from FIG. 5 into the customer database.

Whether or not a minimum test score is required, processing continues with the update database process 180 shown in FIG. 8. The first step 182 of this process is to determine whether the best match 46 contains an identity or is left empty. If it is empty, all processing is discontinued at 184, and the credit card number remains unassociated with an identity in the customer database 34.

If the best match 46 value contains an identity, step 186 determines whether the identity matches an identity already in the customer database 34. If not, step 188 creates a new identity using the information found in demographic database 42. This new identity is then matched with the credit card number so that future uses of this credit card will be automatically associated with this identity. Processing then ends at step 184.

If step 186 determines that the best match identity 46 is already in the customer database 34, then step 190 will update this identity by matching it with the credit card number used in the latest transaction. By doing so, step 190 not only associates the identity with the purchases made in the latest transaction, but also with all other purchases made by this same credit card. Step 190 can also update the identity with other information associated with this identity in the demographic database 42. After this updating, processing stops at step 184.

The update database process 180 could also be responsible for merging multiple identities into one identity where it is found that what had been thought to be two or more people is really one and the same customer. In addition, the update database process 180 could be responsible for checking Nixie files of undeliverable addresses to update the address for the identity, and could also be responsible for removing records for people known to be deceased. These additional responsibilities of the update database process are well-known in the art, and therefore are not specifically shown in the flow chart of FIG. 8.

Of course, many possible combinations of features and elements are possible within the scope of the present invention. For instance, while the present invention was described primarily in the context of a credit card transaction, the invention is equally useful in debit card situations and any other situation where a customer name or another partial identifier is known but an exact identity cannot be determined.

In addition, the present invention is shown as part of a process in FIG. 1 where transaction data is saved to a customer database according to a credit card number even before an identity is clearly associated with the transaction. This is not a pre-requisite for the present invention, and in fact the present invention can be used in any context where a sales transaction needs to be associated with an identity but less than perfect identifying information is known. In fact, the present invention could be used simply to validate already existing associations between identities and credit card numbers.

The present invention is also described as having the potential match list generator 30, the best match generator 40, and the record integrator 50 as separate from the POS location 20 in order to handle multiple POS locations 20. This is not a strict requirement of the present invention, and it would be possible to use the application programs 30, 40, and 50 in the same physical location as POS location 20.

Figure 7:
FIG. 7 is a table showing additional tests.

It would also be possible to generate tests that are different than those set forth in FIGS. 6 and 7. For instance, one possible test might provide a score based on the distance in miles from the customer's address to the store where the purchase is made. This could be useful in embodiments where a trade area was not utilized to narrow the list of potential matches.

Finally, even though the demographic databases 32, 42 are shown as single databases, it is possible and even likely that the information in those databases will be found in multiple databases obtainable from separate, demographic database vendors. Because many such combinations are present, the scope of the present invention is not to be limited to the above description, but rather is to be limited only by the following claims.

What is claimed is:

1. A computer implemented method for identifying a customer in a customer database system that tracks purchase transactions, the customer having purchased a product at a point of sale location by using a payment mechanism to pay for the product purchase, the method comprising:
   a) determining a customer name for the customer from the payment mechanism without requiring the customer to disclose their customer name other than by completing the purchase with the payment mechanism;
   b) creating a computerized list of potential matches, the potential matches each being an identity of a particular person, wherein an identity constitutes information that uniquely identifies a particular person, the list of potential matches being created by
      i) searching in a computerized database for identities having a name similar to the customer name, with similar names being determined through at least one mechanism chosen from the set including identically matching names, nicknames, abbreviations, and known variations of the customer name, and
      ii) combining a plurality of the identities found by searching the computerized database into the computerized list of potential matches; and
   c) developing a profile of demographic characteristics based upon the purchased product, at least one of the demographic characteristics included in the profile coming from the set of characteristics comprising income, parental status, marital status, education, and age;
   d) selecting a best match identity from the computerized list of potential matches, the best match identity indicating which of the plurality of identities in the list of potential matches is to be selected as the identity for the customer name, the best match being selected by
      i) obtaining demographic data concerning each identity within the list of potential matches, and
      ii) comparing demographic data concerning each identity within the list of potential matches with the profile developed based upon the purchased product; and
   e) using the best match identity as the identity for the customer name in the customer database system.

2. The method of claim 1, wherein the computerized database is a general demographic database.

3. The method of claim 2, wherein the step of creating a list of potential matches further comprises searching for potential matches in the customer database system.

4. The method of claim 1, wherein the computerized database is the same database as the customer database system.

5. The method of claim 1, wherein the step of selecting the best match identity further comprises examining, for each identity, prior sales data found in the customer database system relating to that identity and comparing such prior sales data with the purchased product.

6. The method of claim 1, further comprising:
   a first step of obtaining a unique account identifier associated with the payment mechanism and storing the unique account identifier along with the purchased product in the customer database system,
   wherein the profile developed based upon the purchased product is refined according to all prior sales identified in the customer database system as being associated with the unique account identifier.

7. The method of claim 1 wherein the sub-step of searching in a computerized database for identities having a name similar to the customer name further comprises:
   A) creating a trade area for the point of sale location, the trade area being determined through an analysis of past sales at the point of sale location, the trade area defining a geographic region containing the home addresses of a first subset of shoppers that have shopped at the point of sale location, while excluding a second subset of shoppers that have shopped at the point of sale location, and
   B) searching for the identities being associated with an address within the trade area.

8. The method of claim 1, wherein the step of determining a customer name is accomplished by extracting the customer name from an encoded customer name stored on the payment mechanism.

* * * * *

UNITED STATES PATENT AND TRADEMARK OFFICE
CERTIFICATE OF CORRECTION

PATENT NO. : 7,251,625 B2  Page 1 of 1
APPLICATION NO. : 09/970236
DATED : July 31, 2007
INVENTOR(S) : Timothy J. Anglum It is certified that error appears in the above-identified patent and that said Letters Patent is hereby corrected as shown below:

Title Page, Column 2, item (57);
Line 5
After "location" insert --is--.

Sheet 4 of 8 (Referral Numeral 88)
Fig. 4
Line 1
Delete "identies" and insert --identities--, therefor.

Signed and Sealed this

Fifteenth Day of July, 2008

JON W. DUDAS
*Director of the United States Patent and Trademark Office*